United States Patent Office

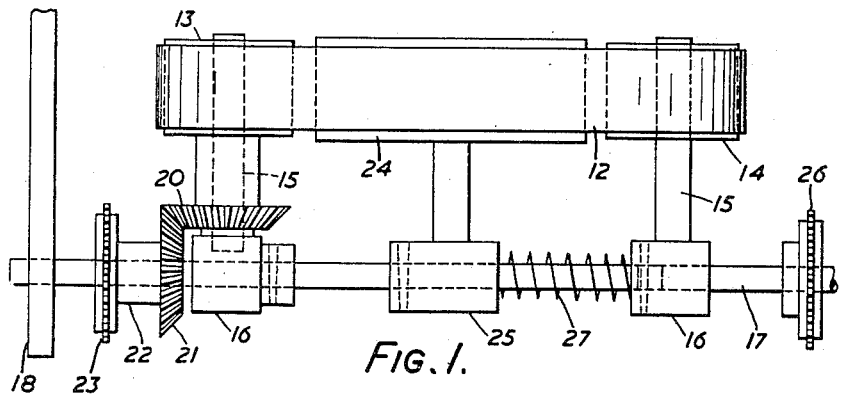
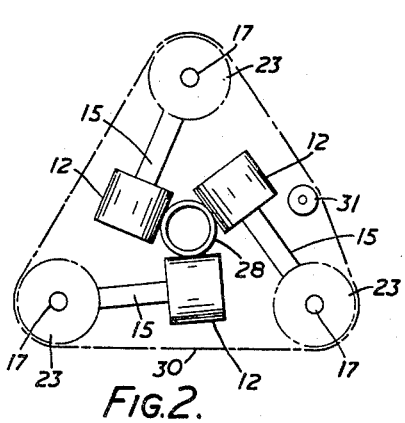 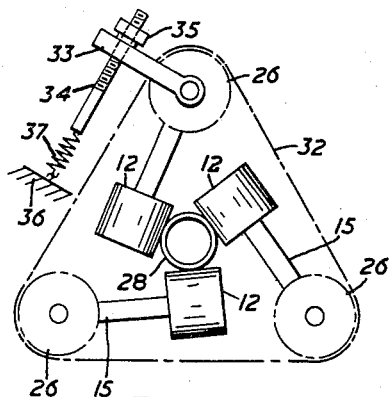
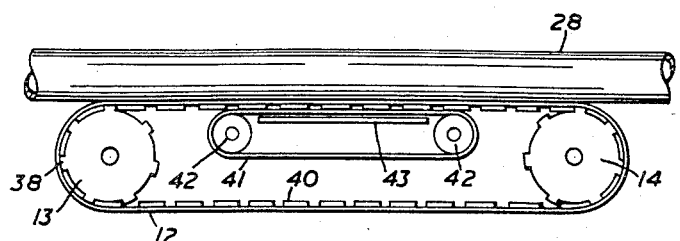

3,018,028
Patented Jan. 23, 1962

3,018,028
RELATING TO APPARATUS FOR TRANSPORTING ELONGATE OBJECTS
Harry Shaw, Hill Hurst, Healey, Whitworth, Rochdale, England
Filed June 2, 1960, Ser. No. 33,590
Claims priority, application Great Britain June 2, 1959
10 Claims. (Cl. 226—172)

This invention relates to apparatus for transporting elongate objects and is particularly concerned with such apparatus for drawing off from an extruding machine extruded tubing.

An object of the present invention is to provide apparatus which is capable of transporting or moving elongate objects of different cross sectional sizes.

According to one aspect, the invention provides apparatus for conveying elongate objects, said apparatus comprising at least three endless conveyors arranged jointly to support the object and move it lengthwise, the conveyors being mounted for pivotal movement about parallel axes surrounding the path of movement of the object to accommodate objects of different cross sectional size.

According to another aspect, the invention provides apparatus for conveying elongate objects, said apparatus comprising a plurality of endless conveyors arranged to engage an object and move it along its length, said conveyors being mounted for movement towards or away from the object to enable objects of different cross sectional size to be fitted therebetween.

When the elongate object is a tube, for example as produced by an extruding machine, each conveyor may be a belt, or band or chain (referred to hereinafter as a band), positioned with all lines contained in the surface of the band and at right angles across the band tangential to the periphery of the tube and at right angles to lines passing lengthwise down the tube at the surface of the tube and parallel to the axis of the tube. The axes about which the conveyors are pivotal all lie in a common cylinder having its axis coincidental with the axis of the tube. The surfaces of all the bands in contact with the tube are equidistant from the axes about which the conveyors are pivoted.

The invention will be more readily understood by way of example from the following description of one form of apparatus for transporting an elongate object, reference being made to the accompanying drawings, in which, FIGURE 1 illustrates one of the conveyors and its mounting,
FIGURE 2 is a view of the apparatus from one end,
FIGURE 3 is a view of the apparatus from the opposite end, and
FIGURE 4 illustrates one way of maintaining the conveyor surface in contact with the tube.

In the embodiment illustrated in the drawings, three conveyors are employed to draw the pipe away from the extruding machine as it is extruded. However, it will be understood that more conveyors may be employed if found desirable, due to the size or shape of the elongate article being moved. One of the conveyors is illustrated in FIGURE 1 and comprises a belt 12 passing round two pulleys 13, 14. The pulleys can rotate freely on shaft 15 secured in sleeves 16 which are splined to a shaft 17 extending at right angles to the shaft 15. Shaft 17 is mounted for rotation in two frames, one of which is shown at 18.

The belt 12 is driven by the pulley 13 which is secured to a bevel gear 20 meshing with a second bevel gear 21 which is attached to a sleeve 22 freely rotatable on shaft 17. Sleeve 22 is also secured to a chain sprocket 23.

Lying within the belt 12 and engaging against one internal surface thereof is a support 24 which is carried by a further sleeve 25, also splined to the shaft 17. Shaft 17 carries a second chain sprocket 26 which enables the shaft and the conveyor to be rotated. A compression spring 27 is arranged round the shaft 17 between the sleeves 16, 25 and biasses the sleeve 16 and the pulley 14 away from the pulley 13, sleeve 16 being splined to shaft 17 to permit movement on it.

The other two conveyors are exactly as described in relation to FIGURE 1 and are disposed as schematically illustrated in FIGURE 2, the three shafts 17 of the three conveyors being disposed at the apices of an equilateral triangle. The shafts 17 are arranged with their axes parallel to the axis of the tube 28 being extruded and are equidistant from that tube. The three chain sprockets 23 of the three conveyors are driven by a single endless chain 30 which, in turn, is driven by a driven sprocket 31. As will be readily understood, the three belts 12 are driven at equal speeds in the same direction and in contact with the periphery of the tube 28 parallel to the axis of that tube, and hence draw the tube away from the extruding machine. The effective surfaces of the belts are maintained in contact with the tube by the support plates 24 (FIGURE 1).

In order that the conveyors may accommodate tubes of different diameters and in order that the conveyors may be passed into contact with the tube, the arrangement shown in FIGURE 3, or its equivalent, is employed. Referring to FIGURE 3, the three chain sprockets 26 are coupled together by a common chain 32 which ensures that any movement of one shaft 17 will be accompanied by equal movements of the other two shafts 17. One of the shafts has secured to it a transverse arm 33 through which passes a threaded shaft 34 having thereon a nut 35. The shaft 34 is attached to the framework at 36 by means of a spring 37 which passes the arm 33 towards framework 36. The nut 35 is initially set for the required size of tube 28 and the spring 37 then acts to bias rotationally the three shafts 17, by means of the chain 32, in a direction causing the conveyor belts 12 to be resiliently forced against the tube 28. If the size of the tube 28 is to be changed, it is an easy matter to adjust nut 35 until the belts 12 are separated sufficiently to accommodate the new diameter of the tube. It will be understood that, although spring means 37 have been illustrated for providing the bias for the shafts 17, other resilient means, such as air cylinders, may be employed. In this latter case, however, means, such as the chain 32, is employed to ensure that any movement of one shaft 17 is accompanied by similar movements of the other two shafts 17.

The support 24 for the belt 12 has been shown in FIGURE 1 as a flat plate. It might equally well be a series of small rollers or other devices. In either case, the support is preferably mounted so as to move about the axis of shaft 17 with the belt 12, so that its action is effected irrespective of the pivotal position of the conveyor.

It is preferred to employ for the conveyor, two pulleys or drums 13, 14 having shallow teeth 38 formed across the width of the pulleys and a rubberised cloth and wire reinforced belt 12 which has projections or teeth 40 across its width on the inner side, to enable it to be driven by the teeth 38 of the pulleys. This type of band has the advantage that it is driven without slip so that the belts of all three conveyors are kept constant. In this case, the flat plate 24 of FIGURE 1 is not always desirable in that it tends to wear the teeth 40 on the belt. Instead, it is preferred to employ a further endless belt 41 arranged on pulleys 42 and located adjacent the part of belt 12 engaging the tube 28. This further belt 41 is provided with a support plate 43 arranged to bias belt 41 against belt 12 and hence belt 12 against tube 28. As before, the pulleys 42 and the support plate 43 are mounted pivotally from the shaft 17 so as to move with the conveyor. When the belt is not of the toothed form described above and illustrated in FIGURE 4, it may be made of leather, rubber or plastic. Alternatively the belt may be replaced by pads of rubber or other resilient material mounted on a chain or chains which pass over sprockets taking the place of the pulleys 13, 14. In that latter case, the pads are pivotally mounted on the chains so that as the chains move round the sprockets, the pads can tilt. This necessitates the chains being arranged so as to give a convergent approach and divergent retractive paths in relation to the tube 28, in order to prevent the pads causing jerky draw off as they tilt in passing round the sprockets.

The conveyors have been illustrated in the drawings as being equally spaced round the tube 12. For some purposes, it may be preferred to have non uniform spacing of the conveyors.

I claim:

1. Apparatus for conveying elongate objects, said apparatus comprising at least three spaced apart endless conveyor means arranged to define between them a conveying path and to support and convey an object along said path in the direction of the longitudinal axis of said object, drive means for driving said conveyor means in conveying motion, and at least three spaced apart pivotal mounting means each mounting one of said conveyor means about an axis extending parallel to the direction of conveying movement of said conveyor means towards and away from said conveying path whereby to accommodate objects of different cross-sectional areas.

2. Apparatus as set forth in claim 1 wherein each said conveyor means comprises a flexible endless band passing around a pair of spaced pulleys and supported on a shaft, the two shafts extending in parallel relation and being supported by a third shaft which is pivotable about its own axis to provide for pivotal movement of said conveyor means towards and away from said conveyor path.

3. Apparatus as set forth in claim 1 wherein said drive means comprises a main driving means and individual drive means associated with each of said conveyor means and means connecting each of said individual drive means with said main drive means whereby said conveyor means are all driven at a common speed.

4. Apparatus as set forth in claim 1 wherein each said conveyor means comprises a flexible endless band passing around a pair of spaced pulleys each supported on a shaft, the two shafts extending in parallel relation and being supported by a third shaft which is pivotable about its own axis, a sprocket wheel rotatably mounted on each of said third shafts, means coupling each of sprocket wheels to drive one of said pulleys, and an endless chain engaging all of said sprocket wheels and a driving sprocket for driving said chain.

5. Apparatus as set forth in claim 1 wherein each said conveyor means comprises a flexible endless band passing around a pair of spaced pulleys each supported on a shaft, the two shafts extending in parallel relation and being supported by a third shaft which is pivotable about its own axis, a sprocket wheel rotatably mounted on each of said third shafts, means coupling each of sprocket wheels to drive one of said pulleys, and an endless chain engaging all of said sprocket wheels, a driving sprocket engaging said chain to impart driving movement thereto, and means for applying torque resiliently to one of said third shafts.

6. Apparatus as set forth in claim 1 wherein each said conveyor means comprises a flexible endless band passing around a pair of spaced pulleys each supported on a shaft, and means resiliently urging said shafts apart.

7. Apparatus as set forth in claim 1 wherein each said conveyor means comprises a flexible endless band passing around a pair of spaced pulleys, and means for pressing a portion of said band extending between said pulleys in a direction towards said conveying path.

8. Apparatus as set forth in claim 1 wherein each said conveyor means comprises a flexible endless band passing around a pair of spaced pulleys, and an auxiliary endless band supported on spaced pulleys disposed between said conveyor band pulleys and arranged to press a portion of said flexible endless band inwardly towards said conveying path.

9. Apparatus as set forth in claim 1 wherein each of said conveyor means comprises a chain supporting pad for engaging an object to be conveyed and passing around a pair of spaced pulleys having sprocket teeth engaging said chain.

10. Apparatus as set forth in claim 1 and including means for resiliently biasing each of said conveyor means in a direction to engage an object moving along said conveying path.

References Cited in the file of this patent

UNITED STATES PATENTS 2,212,132 Shear _____ Aug. 20, 1940
2,935,178 Lutcke _____ May 3, 1960